United States Patent
Lerner et al.

(10) Patent No.: US 10,956,770 B1
(45) Date of Patent: Mar. 23, 2021

(54) SYSTEMS AND METHODS FOR MULTI-DEVICE IMAGE PROCESSING

(71) Applicant: Snap Inc., Santa Monica, CA (US)

(72) Inventors: Scott Lerner, Boulder, CO (US); Bo Ding, Boulder, CO (US)

(73) Assignee: Snap Inc., Santa Monica, CA (US)

( * ) Notice: Subject to any disclaimer, the term of this patent is extended or adjusted under 35 U.S.C. 154(b) by 44 days.

(21) Appl. No.: 15/812,712

(22) Filed: Nov. 14, 2017

(51) Int. Cl.
| | | |
|---|---|---|
| *G06K 9/46* | (2006.01) | |
| *G06T 5/00* | (2006.01) | |
| *G06T 5/20* | (2006.01) | |
| *G09G 5/14* | (2006.01) | |
| *H04N 1/407* | (2006.01) | |
| *H04N 1/409* | (2006.01) | |
| *G06T 7/13* | (2017.01) | |
| *G06F 16/00* | (2019.01) | |

(52) U.S. Cl.
CPC .......... *G06K 9/4604* (2013.01); *G06F 16/00* (2019.01); *G06T 5/002* (2013.01); *G06T 5/20* (2013.01); *G06T 7/13* (2017.01); *G09G 5/14* (2013.01); *H04N 1/409* (2013.01); *H04N 1/4072* (2013.01)

(58) Field of Classification Search
CPC ........ G06K 9/4604; G06F 16/00; G09G 5/14; G06T 7/13; G06T 5/002; G06T 5/20; H04N 1/4072; H04N 1/409
See application file for complete search history.

(56) References Cited

U.S. PATENT DOCUMENTS

| | | | |
|---|---|---|---|
| 5,486,853 A * | 1/1996 | Baxter | H04N 5/23203 348/222.1 |
| 6,038,295 A | 3/2000 | Mattes | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |

(Continued)

FOREIGN PATENT DOCUMENTS

CA   2887596   7/2015

OTHER PUBLICATIONS

Story, "Discover Preview's hidden image editing powers", Sep. 2, 2010, Macworld, retrieved from https://www.macworld.com/article/1153807/previewimageeditpowers.html on Sep. 21, 2019 (Year: 2010).*

(Continued)

*Primary Examiner* — Timothy J Henn
(74) *Attorney, Agent, or Firm* — Schwegman Lundberg & Woessner, P.A.

(57) ABSTRACT

The present application discloses various systems, methods and non-transitory computer-readable mediums that include a first device and a second device to perform processing on a digital image. According to one example, a second one or more edits made using the second device are user subjective and a first one or more edits made using the first device are user agnostic. The second one or more edits are reliant on the first one or more edits for processing flexibility to achieve a desired image attribute.

12 Claims, 11 Drawing Sheets

(56) References Cited

U.S. PATENT DOCUMENTS

| | | |
|---|---|---|
| 8,874,677 B2 | 10/2014 | Rosen et al. |
| 8,909,679 B2 | 12/2014 | Roote et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 2005/0275729 A1* | 12/2005 | Billerbeck ............ G06F 3/0481 348/222.1 |
| 2009/0086030 A1* | 4/2009 | Takamiya ............ G11B 27/034 348/207.1 |
| 2011/0202598 A1 | 8/2011 | Evans et al. |
| 2012/0120256 A1* | 5/2012 | Hwang ............ H04N 5/23229 348/207.1 |
| 2012/0209924 A1 | 8/2012 | Evans et al. |
| 2012/0229655 A1* | 9/2012 | Solomon ............ H04N 5/2251 348/207.1 |
| 2015/0256690 A1* | 9/2015 | Hata ...................... H04N 5/772 348/207.1 |
| 2016/0157221 A1* | 6/2016 | Kim ...................... H04L 67/322 455/450 |

OTHER PUBLICATIONS

Leyden, John, "This SMS will self-destruct in 40 seconds", [Online]. Retrieved from the Internet: URL: http://www.theregister.co.uk/2005/12/12/stealthtext/, (Dec. 12, 2005), 1 pg.

* cited by examiner

| EXAMPLE INITIAL PROCESSING ON IMAGE ON IMAGE CAPTURE DEVICE | EXAMPLE FURTHER PROCESSING ON HOST DEVICE (E.G., A CELLPHONE, TABLET, LAPTOP, ETC.) |
|---|---|
| • BAD PIXEL CORRECTION<br>• BAYER NOISE REDUCTION<br>• CHROMATIC ABERRATION CORRECTION<br>• COLOR SHADING CORRECTION<br>• WHITE BALANCE<br>• BAYER DEMOSAIC<br>• GAMMA CORRECTION OPTIMIZED TO COMPRESS DATA<br>• YUV NOISE REDUCTION | • COLOR CORRECTION<br>• LUMA SHADING CORRECTION<br>• LUMA SHARPENING<br>• CONTRAST/TONE TUNING<br>• SATURATION TUNING<br>• CUSTOMIZED COLOR TUNING<br>• YUV NOISE REDUCTION<br>• DITHERING<br>• CUSTOMIZED GEOMETRIC WRAP CORRECTION<br>• SPECIAL EFFECTS: GLOBAL/LOCAL TONE MAPPING, DIFFERENT COLOR/TONE RELATED FILTERS<br>• APPLICATION BASED EFFECTS/EDITS |

FIG. 2

SYSTEMS AND METHODS FOR MULTI-DEVICE IMAGE PROCESSING

BACKGROUND

As the popularity of social networking grows, the number of digital images and videos generated, edited and shared using such social networks grows as well. The present inventors recognize some drawbacks with the current methodology by which digital images and videos are processed. For example, when a digital image or video file is edited, the appearance of the original image/video file is generally modified and replaced by the new image/video file. Different devices edit image/video files differently.

Additionally, different devices also generally display the same image differently. Thus, an Apple iPhone® will process and display a digital image or video file differently than a Samsung Galaxy®, for example. This can lead to "data lock" with the image/video having a certain appearance due to the device being used that cannot be fully undone if the end user later desires a different appearance. Additionally, as the number of digital images and videos generated, edited and shared increases, the volume of data that must be carried by a network increases. This increase in data can result in increased download times and increased battery usage for the user.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 is a table showing example processes that can be performed first on an image capture device and example processes that can be performed subsequently on a host device according to an example of the present application.

DETAILED DESCRIPTION

Figure 1:
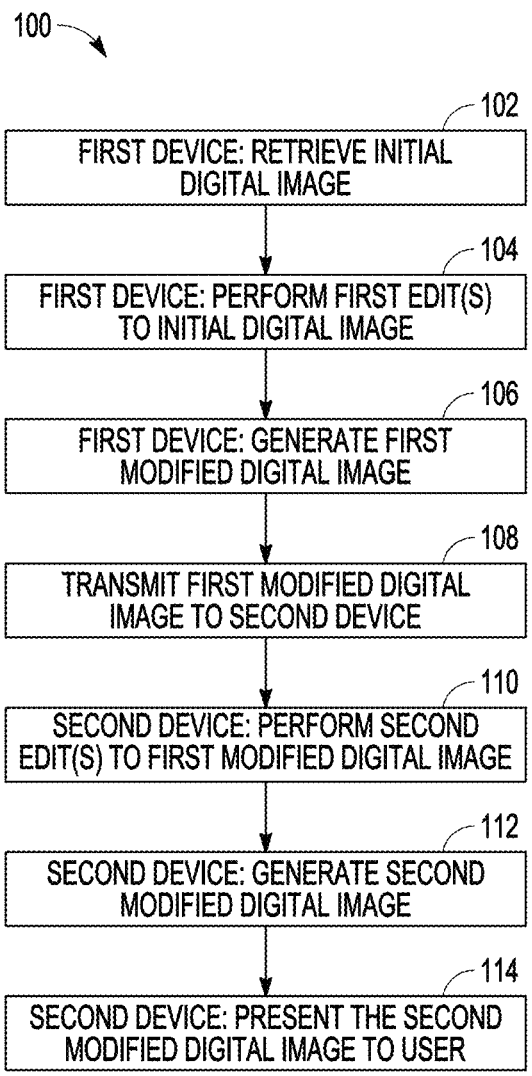
FIG. 1 is an exemplary flow diagram of a method for digital image/video processing using multiple devices according to an example of the present application.

Among other things embodiments of the present disclosure facilitates reduction of image/video file size for better transfer efficiency, and facilitates optimization of image/video processing by separating the processing such that some initial image/video processing is performed on a first device (such as an image capture device) and further image/video post-processing is performed on a second device (e.g., a host device) to achieve a desired appearance. This methodology can facilitate reduced download times, reduced battery usage, and increased process optimization with respect to digital image(s)/video(s)s shared over social networks. Moreover, increased quality and/or flexibility in image processing is promoted by a multi-device integrated image processing mechanism, for example by providing substantially similar image/video files after the initial processing across different hosting devices/platforms, with the image/video having a neutral look with respect to sharpening, saturation, etc.

Worded differently, the present disclosure integrates the image tuning of a display application on a host device with image signal processor tuning of a camera of a separate image capture device for better results. The image capture device (e.g., a pair of camera-enabled smart glasses) captures an image/video and can then tune that image to a neutral look with respect to a number of image attributes, such as sharpening, saturation, etc. The display application (e.g., a mobile device application for a smart phone) can then further tune the image to the desired look (e.g., apply filters). For example, for a "fun" look, the display application can default to displaying a saturated image. The user can then change this look as they desire. One advantage of this approach is that with the first part of tuning done on the image capture device, the image/video file can be optimized for better transfer efficiency to the host device. This can reduce download times and reduce battery usage. Furthermore, the above described approach can keep native data intact as much as possible to enable more freedom for post-tuning using the host device for user preferred look of the image/video after transmission, without introducing extra noise and artifacts, etc.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

For example, the present discloses various systems, methods and non-transitory computer-readable mediums that include a first device and a second device to perform processing on a digital image. According to one example, a second one or more edits made using the second device are user subjective and a first one or more edits made using the first device are user agnostic. The second one or more edits are reliant on the first one or more edits for processing flexibility to achieve a desired image attribute.

In the description that follows, the terms "first device" and "second device" refers to the respective separate devices that perform complementary processing of image data. According to one embodiment, the image processing by the first device is user agnostic, non-elective, automatic, or the like (i.e., this image processing is done without the direction/behest/input or the like of the user and/or without the use of artificial intelligence direction/behest/input based upon a user preference). Additionally, the image processing by the first device is done to enable more freedom/flexibility of the image processing subsequently done by the second device and is done to achieve better image quality relative to image file size. Thus, the image processing by the first device is done to reduce the constraints on the image processing done by the second device to increase efficiency. The image processing done by the first device is additionally done preceding a first presentation of the image to the user (e.g. via a display) for approval, dismissal, or user-selected editing. In contrast, and according to one embodiment, the image processing done by the second device is criteria driven (i.e. is based upon one or more of: a second algorithm, is user driven—based upon individual criteria and/or preferences of the user to achieve a desired "look", is participation driven—to achieve a particular design criteria set by a group or community using an application, or the like). Put another way, the image processing done by the second device is not done to increase freedom/flexibility of any further image processing done by subsequent devices or systems but is rather subjective or intended to achieve a desired image attribute.

As used herein, the term "edit" or "editing" describes digital image/video processing and/or techniques such as one or more of bad pixel correction, Bayer noise reduction, chromatic aberration correction, color shading correction, white balance, Bayer de-mosaic, gamma correction to optimized to compress data, YUV noise reduction, color correction, luma shading correction, luma sharpening, contrast/tone tuning, saturation tuning, customized color tuning, dithering, customized geometry wrap correction, special effects and application based edits, for example. As used herein, the terms "tune" or "tuning" is used synonymously with the terms "edit" or "editing" to describe digital image/video processing and/or techniques. Such digital image/video processing can be performed with input by a user such as through a user interface in some cases and/or can be performed using artificial intelligence based upon prior user behavior, for example. The terms "imaging" "image" or "images" are used throughout the remainder of this document including in the claims and include any one or any combination of the following: a single still image, a plurality of still images that can include a series of still images taken over a distinct macro-time sequence (such as taken with a burst camera function), a video (i.e. a series of still images taken of a distinct micro-time sequence), a plurality of videos, etc. The terms "image attributes" "image attribute" "look" or the like refers to criteria that can be achieved by editing that effect the appearance of the image. These include sharpness, saturation, tone mapping, hue, contrast or the like.

Figure 1A:
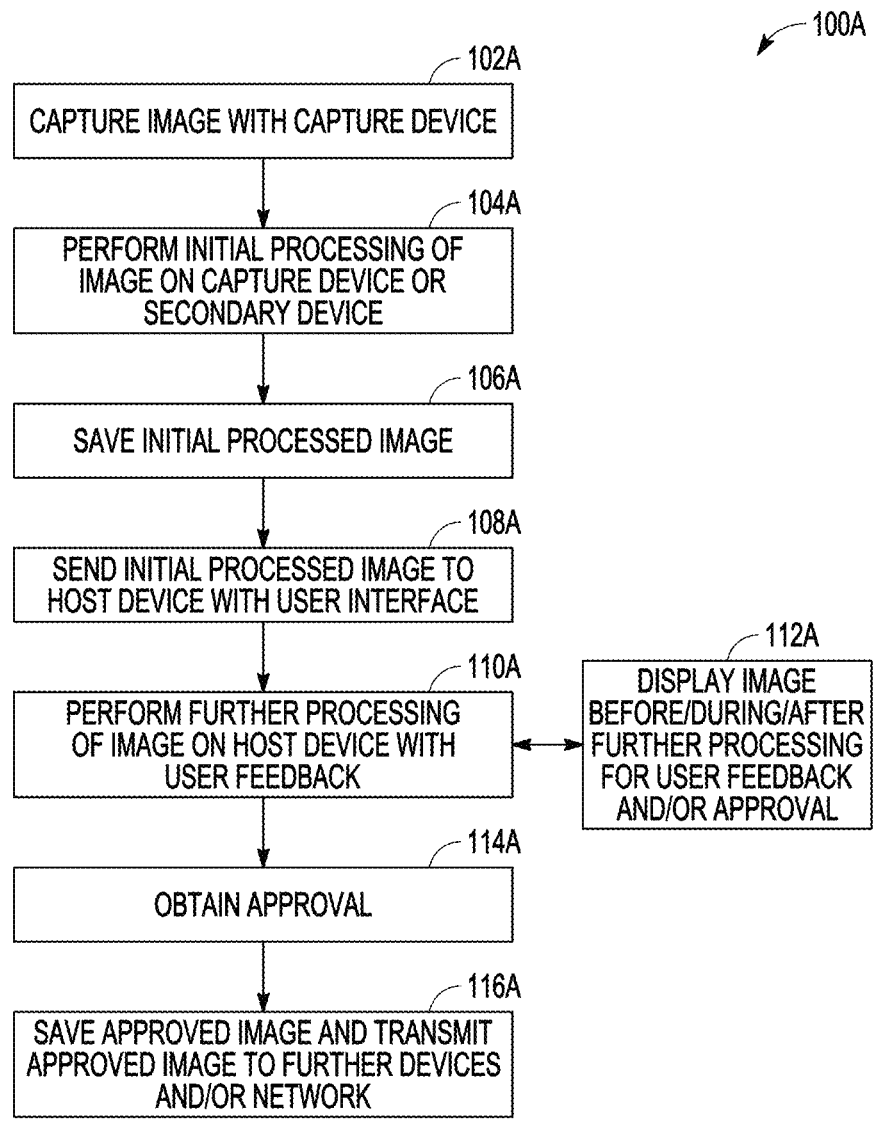
FIG. 1A is a second exemplary flow diagram of a method for digital image/video processing using multiple devices according to an example of the present application.

FIGS. 1 and 1A are flow charts showing an example methods 100 and 100A for editing a digital image using multiple devices to achieve better transfer efficiency and optimize digital image processing. The methods 100 and 100A can utilize a first device and a second device for the editing process. The first device can comprise a computer enabled device or plurality of devices and can have one or more processors or a system including processor(s) configured for image tuning. The one or more processors or the system including a processor(s) can comprise an image signal processor (ISP) or SW/HW imaging system, for example. Contemplated ISPs can utilize a field-programmable gate array (FPGA) integrated circuit, an application-specific digital circuit (ASIC), an application-specific standard products (ASSP) digital circuit, system on chip (SoC), for example. The second device can comprise a computer enabled device or plurality of devices and can have one or more processors or a system including processor(s) configured for image tuning. The one or more processors or the system including a processor(s) can comprise the image signal processor (ISP) or the SW/HW imaging system discussed above, for example.

Figure 7:
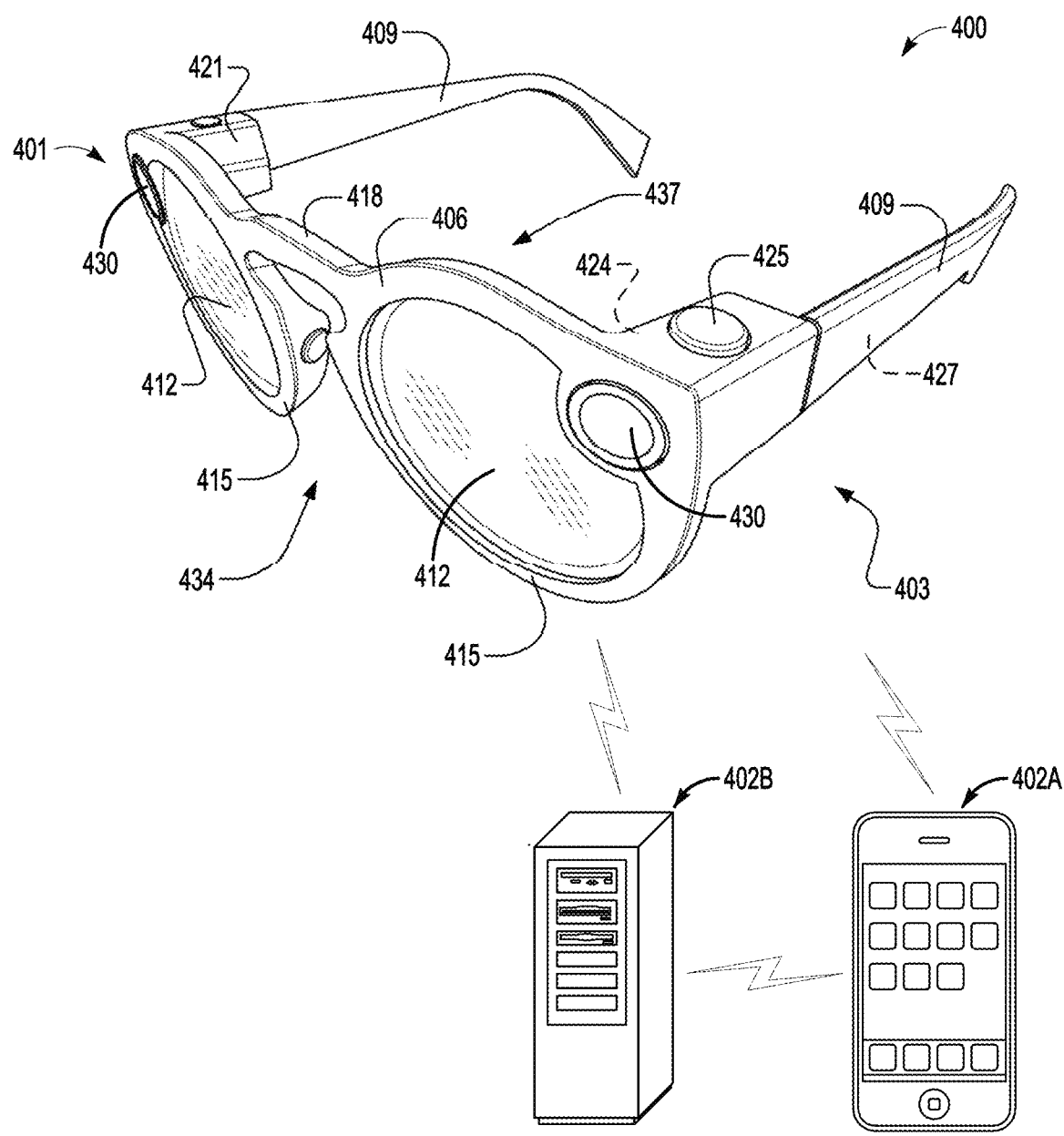
FIG. 7 is a perspective view of a system that can include a first device such as a pair of smart glasses that can comprise the image capture device and/or a network device and a second device such as a smartphone and/or the network device according to an example of the present application.

Examples of computer enabled devices utilizing hardware and/or software that can be used in the methods 100 and 100A are provided in reference to FIGS. 3, 4 and 7-10. For example, the first device can comprise smart glasses (FIG. 7). Such smart glasses can be commercially available spectacles from Snap Inc., available at https://www.spectacles.com/, for example. However, the first device can alternatively comprise, but is not limited to, a wearable device, a digital camera, a mobile phone, desktop computer, laptop, portable digital assistant (PDA), smart phone, tablet, ultra book, netbook, laptop, server, multi-processor system, microprocessor-based or programmable consumer electronic, game console, set-top box, a system of computer enabled devices, or any other computer enabled device. The second device can comprise a host device. The second device can comprise, but is not limited to, a wearable device, a digital camera, a mobile phone, desktop computer, laptop, portable digital assistant (PDA), smart phone, tablet, ultra book, netbook, laptop, server, multi-processor system, microprocessor-based or programmable consumer electronic, game console, set-top box, a system of computer enabled devices, or any other computer enabled device.

According to some examples, the first device can comprise an image capture device having a camera configured to capture an initial digital image used in the method 100, for example. The digital image editing discussed with regard to the first device can be carried out on the image capture device. However, according to further examples the first device can comprise a secondary device that receives the initial digital image from the image capture device. Thus, the initial digital image can be sent to the first device from the image capture device via a network (e.g., the Internet, further examples discussed subsequently).

According to the example of method 100, the first device can retrieve 102 the initial digital image and can perform 104 a first one or more edits to the initial digital image. Such first one or more edits can comprise one or more of bad pixel correction, Bayer noise reduction, chromatic aberration correction, color shading correction, white balance, Bayer de-mosaic, gamma correction to optimized to compress data, and YUV noise reduction, for example. The first one or more edits to the initial digital image can comprise nominal edits that are designed to pre-process image data and compress the image data so it is optimized for more efficient (e.g., more flexible) processing with the second device. The one or more edits can additionally make data transfer more efficient. Such first one or more edits are done to maintain as much information as possible given image file size constraints.

The method 100 can generate 106, based on the first one or more edits, a first modified digital image. The first modified digital image 104 can be transmitted 108 by the first computer enabled device to the second device. The second device can then perform 110 a second one or more edits to the first modified digital image and can generate 112, based on the second one or more edits, a second modified digital image. The second one or more edits can comprise one or more of color correction, luma shading correction, luma sharpening, contrast/tone tuning, saturation tuning, customized color tuning, YUV noise reduction, dithering, customized geometry wrap correction, special effects and application based edits, for example. The second one or more edits to the first modified digital image are criteria driven edits (e.g., can be user preferred/driven) done to enable user(s) to create more engaging content given the processing flexibility/freedom obtained from the first one or more edits. Thus, the second one or more edits are reliant upon the first one or more edits to achieve a desired image attribute(s). The method 100 can present 114 the second modified digital image on a display of a user interface coupled to the second device.

According to the example of FIG. 1, the edits performed on the first device (i.e. the first one or more edits) can comprise between about 20% to about 40% of the total edits performed by the method 100 to achieve a desired look for the digital image that is acceptable to the user. Thus, the remainder of the edits performed on the second device (i.e. the second one or more edits) can comprise between about 60% to about 80% of the total edits performed by the method 100. As discussed previously, according to some examples the first one or more edits performed on the first device can give the first modified image a neutral look with respect to sharpening, saturation, etc. These edits can be performed without user discretion (i.e. according to fixed instructions for the editing). In contrast, the second one or more edits performed on the second device can be performed at user discretion or according to artificial intelligence rules based upon user behavior. Thus, in some embodiments the second one or more edits can be performed on a display application (e.g., a mobile device application for a smart phone) run on the second device. The second one or more edits can then further modify (e.g., apply filters) the first modified image to achieve the second modified image and obtain the desired look.

In some cases, the second one or more edits to achieve the second modified image may not obtain the desired look. For example, the second one or more edits could be made by artificial intelligence that learns the user's typical desired look. However, the user can further modify this look in some cases at the user's discretion. In such cases, at the user's discretion and using the user interface and display application, for example, can perform a third one or more edits to the second modified digital image on the second device. The method 100 can then generate a third modified digital image based on the third one or more edits to the second modified digital image.

The second device can also transmit the second modified digital image or third modified digital image to further devices via a network. The network can include an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, a social media network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The example method 100A of FIG. 1A describes an example where the first device comprises the image capture device. The method captures 102A the image with the image capture device. Initial processing (e.g., digital image editing) is performed 104A on the image capture device (and/or a secondary device(s) and/or system(s) as discussed further in reference to FIG. 4). After completion of the initial image editing, the modified image can be saved 106A. The modified image can be sent 108A to a host device (i.e. the second device) with the user interface including the display. Using the host device, further digital image editing can then be performed 110A. Thus, the digital image editing process of method 100A is distributed over at least two devices for better image file transfer efficiency and to improve process optimization for digital image editing.

The further digital image editing 110A can be performed by the user or by artificial intelligence as previously described. User feedback and input regarding the further digital image editing can be obtained. During the method 100A and indeed during virtually any of the steps 102A, 104A or 108A, (i.e. before, during or after further digital editing using the host device is obtained) the digital image may be displayed 112A for such user input and/or approval. However, according to one embodiment the digital image would not be displayed prior to initial edits on the image capture device but rather the initial digital edits would be made and then sent to the host device for subsequent display after the further digital image editing on the host device has been performed. Once user approval is obtained 114A, the second modified image with the further digital image edits can be saved and transmitted 116A to further devices and/or to the network. Further digital image editing can be performed on the further devices in a collaborative manner using the network.

FIG. 2 shows a table 120 including examples of the digital image edits that can be performed by the systems, methods and devices discussed herein. The table 120 shows the first one or more edits to the first digital image that can be initially performed on the first device (e.g., the image capture device) and the second one or more edits that can then subsequently be additionally performed on the second device (e.g., the host device) to the second digital image. The first one or more edits can include one or more of bad pixel correction, Bayer noise reduction, chromatic aberration correction, color shading correction, white balance, Bayer de-mosaic, gamma correction to optimized to compress data, and YUV noise reduction, for example. The second one or more edits can comprise one or more of color correction, luma shading correction, luma sharpening, contrast/tone tuning, saturation tuning, customized color tuning, YUV noise reduction, dithering, customized geometry wrap correction, special effects and application based edits, for example.

Figure 3:
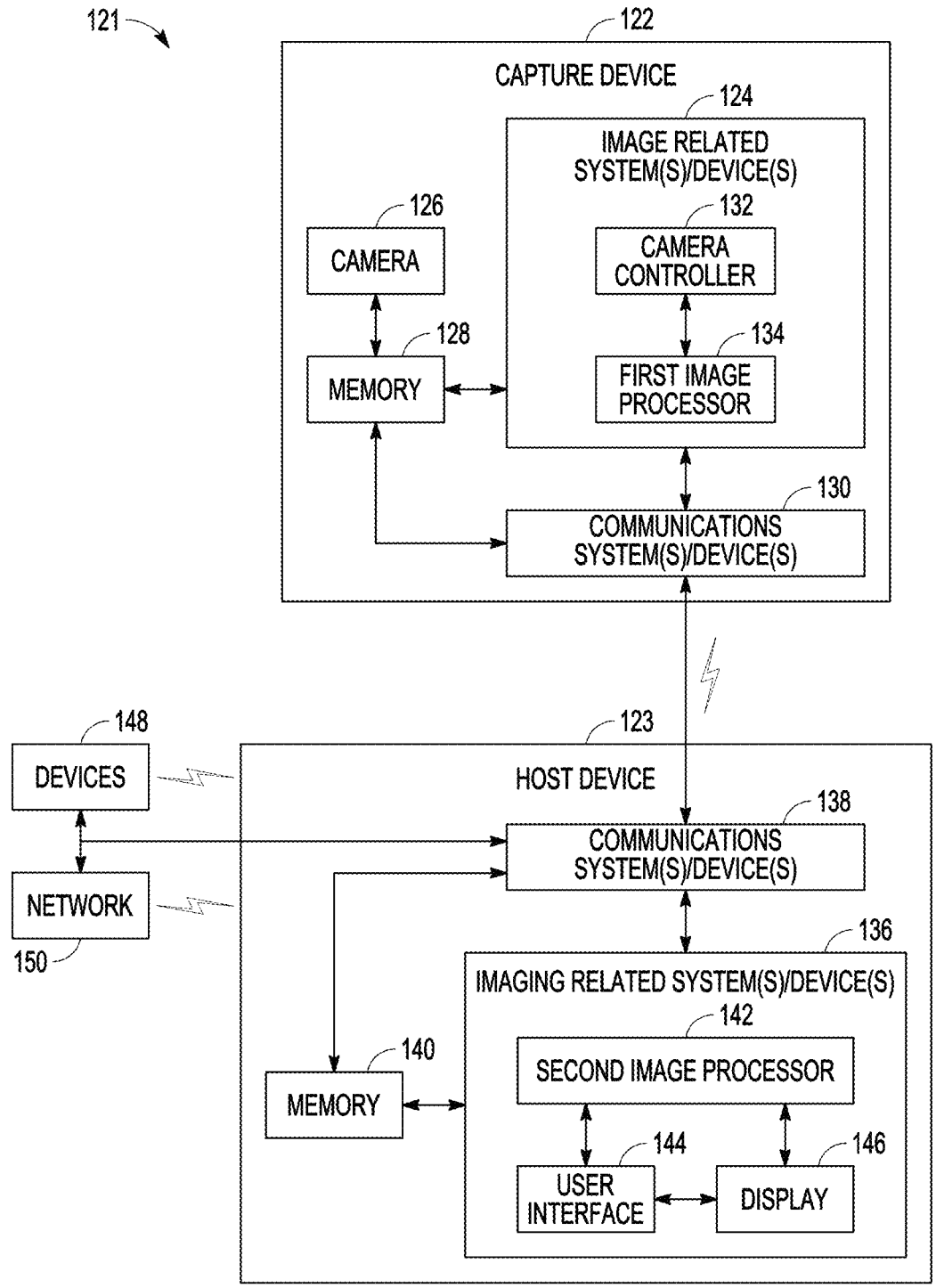
FIG. 3 is a block diagram showing an example system using multiple devices for performing image/video processing according to an example of the present application.

FIG. 3 is a diagram showing an example system 121 for editing a digital image using multiple devices. The system 121 can be used to exchange data (e.g., digital image file and associated content) over a network.

The system 121 thus includes a first device and a second device. One or both of the first device and the second device can comprise more than a single device according to some embodiments. As previously discussed, the first and/or second device can comprise, but is not limited to, a wearable device, a digital camera, a mobile phone, desktop computer, laptop, portable digital assistant (PDA), smart phone, tablet, ultra book, netbook, laptop, server, multi-processor system, microprocessor-based or programmable consumer electronic, game console, set-top box, a system of computer enabled devices, or any other computer enabled device.

According to the example embodiment of FIG. 3, the first device can comprise the image capture device 122 having a camera 126 and the second device can comprise the host device 123. The image capture device 122 can include imaging related system(s) and/or device(s) 124, the camera 126, memory 128 and communications system(s) and/or device(s) 130. The imaging related system(s) and/or device(s) 124 can include a camera controller 132 and a first image processor 134. The host device 123 can include imaging related system(s) and/or device(s) 136, communications system(s) and/or device(s) 138 and memory 140. The imaging related system(s) and/or device(s) 136 can include a second image processor 142, a user interface 144 and a display 146.

As shown in the example of FIG. 3, the imaging related system(s) and/or device(s) 124, the camera 126, memory 128 and communications system(s) and/or device(s) 130 can be part of the image capture device 122. However, according to further examples such components or systems can be remote from the image capture device 122. The camera 126 can communicatively couple with the imaging related system(s) and/or device(s) 124 including the camera controller 132 and memory 128. The memory 128 can communicatively couple with the imaging related system(s) and/or device(s) 124 including the first image processor 134, the camera 126 and the communications system(s) and/or device(s) 130. The communications system(s) and/or device(s) 130 can communicatively couple with the imaging related system(s) and/or device(s) 124, the memory 128 and additional computer enable devices such as the host device 123, a network 150 and/or additional devices 148. Thus, the image capture device 122 can interface with other devices (at minimum the host device 123), a communications network (such as the network 150) and can obtain resources from one or more server systems or other devices (the additional devices 148).

Similarly, the imaging related system(s) and/or device(s) 136, the communications system(s) and/or device(s) 138, and the memory 140 can be of the host device 123. However, according to further examples such components or systems can be remote from the host device 123. The memory 140 can communicatively couple with the imaging related system(s) and/or device(s) 136 including the second image processor 142 and the communications system(s) and/or device(s) 138. The communications system(s) and/or device(s) 138 can communicatively couple with the imaging related system(s) and/or device(s) 136, the memory 140 and additional computer enable devices such as the image capture device 122, the network 150 and/or additional devices 148. Thus, the host device 123 can interface with other devices (at minimum the image capture device 122), a communications network (such as the network 150) and can obtain resources from one or more server systems or other devices (the additional devices 148).

According to one embodiment, the communications system(s) and/or device(s) 130 can comprise a first communication module that can be communicatively coupled to the first image processor 134. The camera 126 can capture the initial digital image for processing on the first computer enabled device 122. The memory 128 can be communicatively coupled to the camera controller 132 and can store instructions that, when executed by the camera controller 132, cause the camera 126 to capture the initial digital image. The memory 128 can be communicatively coupled to the first image processor 134 and can store instructions that, when executed by the first image processor 134, cause the image capture device 122 to perform a first one or more edits on an initial digital image, generate, based on the first one or more edits, a first modified digital image, and transmit the first modified digital image using the first communication module.

Turning to the host device 123, the first communication module (i.e. the communications system(s) and/or device(s) 130 can communicatively couple with the communications system(s) and/or device(s) 138 of the host device 123. The communications system(s) and/or device(s) 138 can comprise a second communication module that can be communicatively coupled to the second image processor 142. The memory 140 can be communicatively coupled to the second image processor 142 and can store instructions that, when executed by the second image processor 142, cause the host device 123 to retrieve the first modified digital image using the second communication module, perform a second one or more edits on the first modified digital image, generate, based on the second one or more edits, a second modified digital image, and present the second modified digital image on the display 146 of the user interface 144 for one or more of user review, additional edit via the user interface 144 and user approval. The second one or more edits can performed by the user using the user interface 144 or via artificial intelligence.

In some cases, the second one or more edits to achieve the second modified image may not obtain the desired look. For example, the second one or more edits could be made by artificial intelligence that learns the user's typical desired look. However, the user can further modify this look in some cases at the user's discretion. In such cases, at the user's discretion and using the user interface 144 and the display 146, for example, the memory 140 can further store instructions for causing the system 121 to generate a third modified digital image based on the additional edit to the second modified digital image received from the user via the user interface 144. Thus, according to some examples, the third one or more edits can performed via the user interface and the second one or more edits are performed by artificial intelligence. Additionally, the host device 123 can transmit the third modified digital image to the one or more of a plurality of further devices (e.g., the devices 148) or the network 150 using the second communication module. Thus, the memory 140 can include instructions for causing the system 121 (in particular the host device 123) to perform such transmission.

The image capture device 122 and/or host device 123 can include one or more applications supporting the editing function discussed above such as a display application. For example, the one or more applications can provide various functions that enable a user to annotate or otherwise modify or edit media content associated with an image or a message. For example, the one or more applications can provide functions related to the generation and publishing of media overlays for messages. For example, the display application can operatively supply a media overlay (e.g., a Snap filter) to a digital image based on a known user preference. In another example, the display application can operatively supply a media overlay to the digital image based on other information, such as, social network information of the user of the host device 123. Such media overlay can include audio content, visual content and/or visual effects, for example. Examples of audio and visual content include texts, logos, animations, and sound effects. An example of a visual effect includes application of a filter such as color overlaying. The audio and visual content or the visual effects can be applied to a media content item (e.g., a digital image) at one or both of the image capture device 122 and host device 123. For example, the media overlay can occur on the host device 123 and include text that can be overlaid on top of the digital image taken by and initially edited by the image capture device 122. In some examples, a collection of content (e.g., messages, including digital image(s), text and/or audio) may be organized into an "event gallery" or an "event story." Such a collection may be made available for a specified time period, such as the duration of an event to which the content relates. For example, content relating to a music concert may be made available as a "story" for the duration of that music concert.

The one or more applications can utilize filters in making edits to digital image. Such filters can comprise overlays that are displayed as overlaid on the digital image during presentation to a recipient user. Filters may be of varies types, including a user-selected filters from a gallery of filters presented to the user when using the display application. Other types of filters include a real-time special effect and/or sound that can be added to the digital image.

Figure 4:
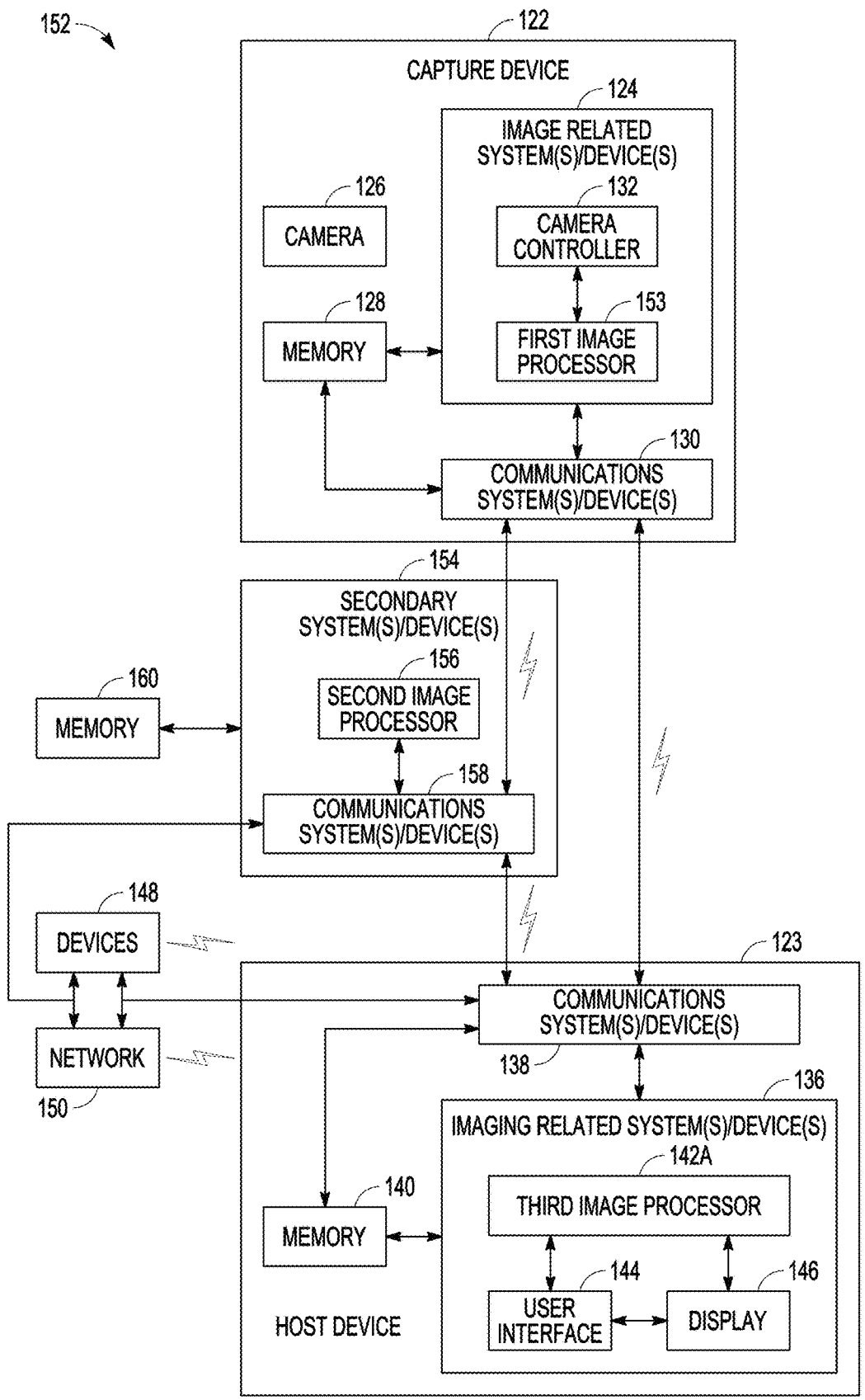
FIG. 4 is a block diagram of an example system according to another embodiment where multiple devices are utilized for performing image/video processing according to an example of the present application.

FIG. 4 is a diagram showing another example system 152 for editing a digital image using multiple devices. The system 152 can be used to exchange data (e.g., digital image file and associated content) over a network.

The system 152 can include the first device (here a secondary device(s)/system(s) 154) and the second device (here the host device 123). Most of the components of the image capture device 122 and the host device 123 were previously described in reference to the system 121 of FIG. 3. Thus, the function and arrangement of these previously illustrated and described components will not be discussed in great detail in reference to FIG. 4. As indicated previously, one or both of the first device and the second device can comprise more than a single device according to some embodiments.

According to the example embodiment of FIG. 4, the image capture device 122 having the camera 126 and the second device can comprise the host device 123. The image capture device 122 can include the imaging related system(s) and/or device(s) 124, the camera 126, the memory 128 and the communications system(s) and/or the device(s) 130. The imaging related system(s) and/or device(s) 124 can include the camera controller 132 and a first image processor 153. The host device 123 can include the imaging related system(s) and/or device(s) 136, the communications system(s) and/or device(s) 138 and the memory 140. The imaging related system(s) and/or device(s) 136 can include a third image processor 142A, the user interface 144 and the display 146.

It is important to note that in the example of FIG. 4, the first device does not comprise the image capture device 122. Rather, the first device comprises the secondary device(s) and/or system(s) 154. The secondary device(s) and/or system(s) 154 can include a second image processor 156, a communications system(s) and/or the device(s) 158 and a memory 160. The system 152 can utilize the secondary device(s) and/or system(s) 154 in the manner of the first device previously described in reference to FIGS. 1-3. Thus, in some examples the communications system(s) and/or device(s) 158 can comprise the first communication module that can be communicatively coupled to the second image processor 156. The second device(s) and/or system(s) 154 via the first communication module can receive the initial digital image from the image capture device 122. The memory 160 can be communicatively coupled to the second image processor 156 and can store instructions that, when executed by the second image processor 156, cause the second device(s) and/or system(s) 154 to perform a first one or more edits on an initial digital image, generate, based on the first one or more edits, a first modified digital image, and transmit the first modified digital image using the first communication module.

In some example embodiments, the image capture device 122 may perform no editing of the initial digital image captured by the camera 126 prior to the image data file being sent to the secondary device(s) and/or system(s) 154 via the communications system(s) and/or device(s) 130 in some examples. However, in some examples the first image processor 153 of the image capture device 122 can perform some edits to the initial digital image (e.g., one or more of bad pixel correction, Bayer noise reduction, chromatic aberration correction, color shading correction, white balance, Bayer de-mosaic, gamma correction to optimized to compress data, and YUV noise reduction, for example) while the second image processor 156 can perform other edits (e.g., one or more of bad pixel correction, Bayer noise reduction, chromatic aberration correction, color shading correction, white balance, Bayer de-mosaic, gamma correction to optimized to compress data, and YUV noise reduction, for example).

It is further contemplated that editing of the digital image can be performed in parallel or series. In a series arrangement, some amount of editing of the initial digital image can be performed on the image capture device 122 and the modified digital image (after the edits are complete) can then be sent to the secondary device(s) and/or system(s) 154 for further editing of the digital image. The second modified file from the secondary device(s) and/or system(s) 154 is then sent to the host device 123 for further editing as previously discussed. In a parallel arrangement, some amount of editing of the initial digital image can be performed on the image capture device 122 and some amount of editing of the initial digital image can be performed on the secondary device(s) and/or system(s) 154 in tandem. Each of the two modified digital images can then be sent to the host device 123 or an intermediate device(s) or system(s) (not shown) for combination of the edited files (and for further edits if so desired). Thus, in some embodiments the communications system(s) and/or device(s) 130, the communications system(s) and/or device(s) 138 and the communications system(s) and/or device(s) 158 can be communicatively coupled with one another as shown in FIG. 4. In further examples, the communications system(s) and/or device(s) 158 can be communicatively coupled to the device(s) 148 and/or network 150 previously described.

Figure 5:
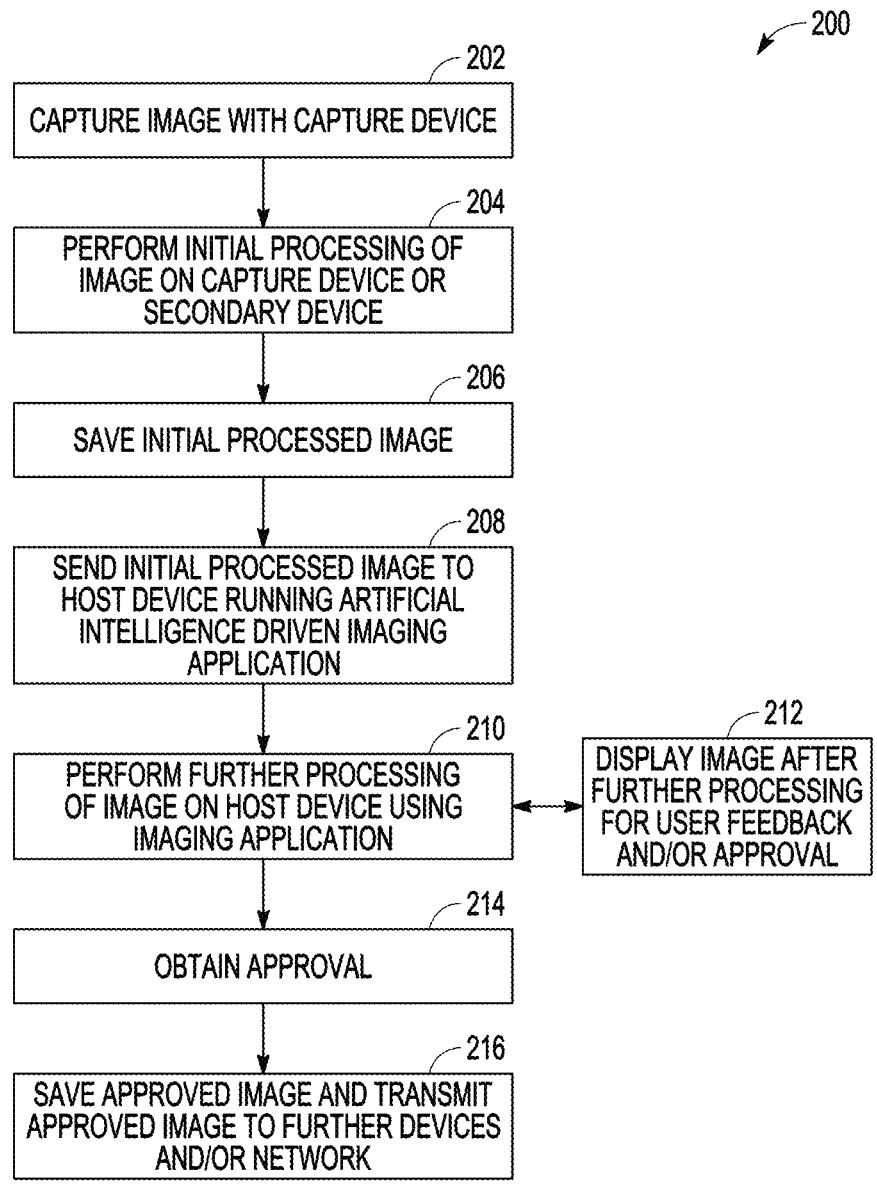
FIG. 5 is an exemplary flow chart of a method for digital image/video processing using multiple devices at least one of which runs an artificial intelligence driven imaging application according to an example of the present application.

FIG. 5 is a flow chart of yet another method 200 for editing a digital image using multiple devices to achieve better transfer efficiency and optimize digital image processing. The method 200 of FIG. 5 differs from those of FIGS. 1 and 1A in that artificial intelligence is used in making at least some of the one or more edits to the digital image.

The example method 200 describes an example where the first device comprises the image capture device. The method captures 202 the image with the image capture device. Initial processing (e.g., digital image editing) is performed 204 on the image capture device (and/or a secondary device(s) and/or system(s) as discussed in reference to FIG. 4). After completion of the initial image editing, the modified image can be saved 206. The modified image can be sent 208 to a host device (i.e. the second device) with the host device running an artificial intelligence driven imaging application, for example. Using the host device, further digital image editing can then be performed 210 at the direction of the artificial intelligence. Thus, the digital image editing process of method 200 is distributed over at least two devices for better image file transfer efficiency and to improve process optimization for digital image editing.

User feedback and input regarding the further digital image editing can be obtained. During the method 200 and indeed during virtually any of the steps 202, 204 or 208, (i.e. before, during or after further digital editing using the host device is obtained) the digital image may be displayed 212 for such user input and/or approval. However, according to one embodiment the digital image would not be displayed prior to initial edits on the image capture device and after editing by the artificial intelligence on the host device. Rather the initial digital edits would be made and then sent to the host device for further edits at the direction of the artificial intelligence and using the imaging application. Subsequent display on the host device after the at least two rounds of digital image editing has been performed would then occur. Once user approval is obtained 214, the second modified image with the further digital image edits can be saved and transmitted 216 to further devices and/or to the network. Further digital image editing can be performed on the further devices in a collaborative manner using the network.

Figure 6:
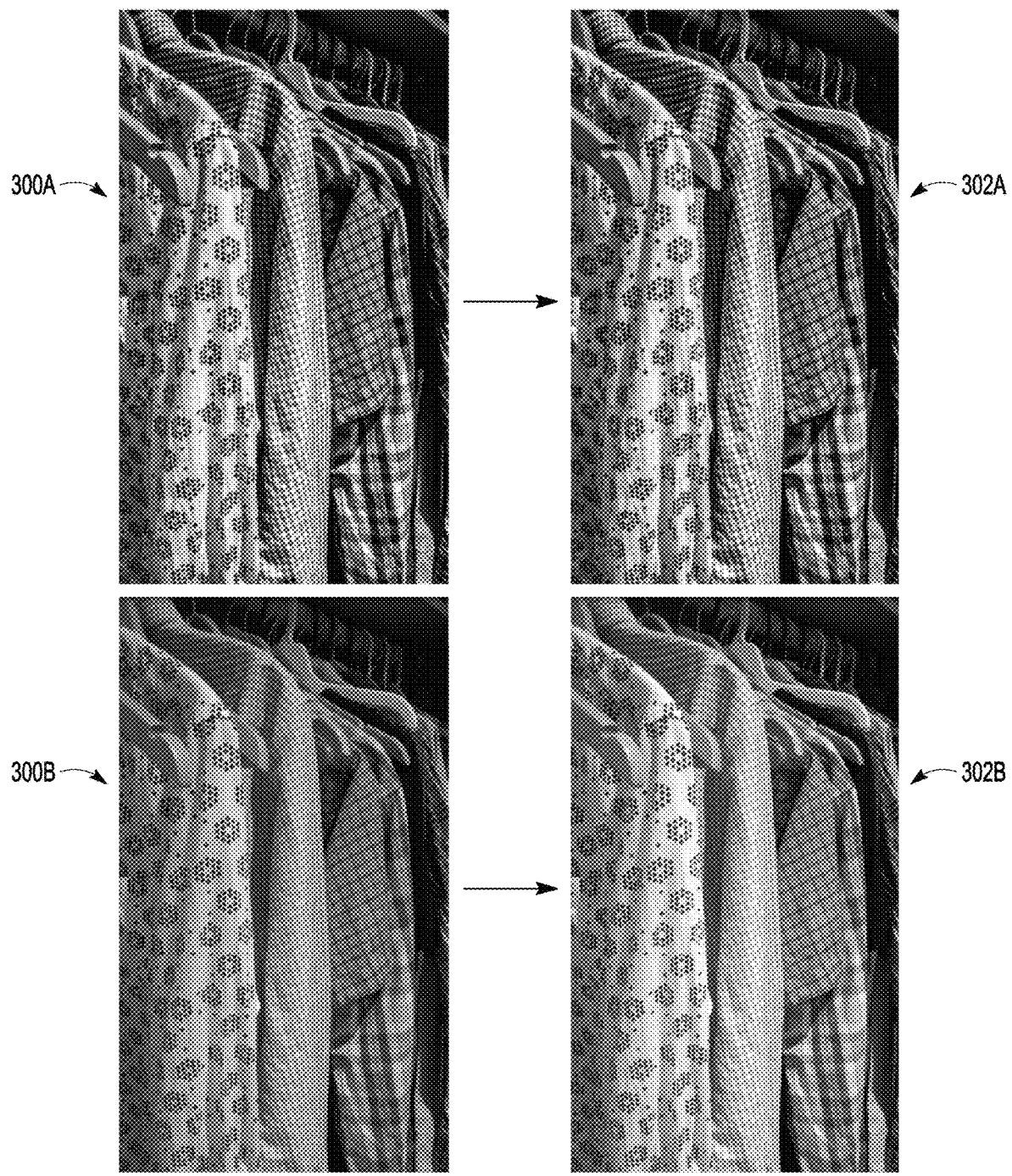
FIG. 6 shows two photographs taken by image capture devices that have undergone different initial processing performed thereon and further shows two further photographs after the same subsequent processing was performed using the same host device according to an example of the present application.

FIG. 6 shows two photographs 300A and 300B taken with a first device and the two photographs 302A, 302B after subsequent processing using identical edits on the same host device. According to the example of FIG. 6, the two photographs 300A and 300B are not identical but differ slightly as the result of initial processing being different for each photograph 300A and 300B on the first device. Because these two photographs 300A and 300B are not identical after such initial processing (contain different data as the result of different editing or display (referred to as "image lock" herein)), the photographs 302A and 302B differ markedly after further editing even when the same host device is used and the same further edits are performed on each photograph with the host device.

In FIG. 6, the photograph 300A was obtained after initial image processing from the initial digital image. Both the photograph 300A and the initial image processing were done on one a first device. This initial image processing gives the photograph 300A a more saturated and sharpened look. In this example, such image processing is done using a "pop" digital editing feature of a Nexus™ smartphone (the first device) by Google Inc. The photograph 302A is then further image processed from photograph 300A and modified using an image editor on a second device such as a laptop (Mac®) with "preview" photo using the "auto levels" feature for color and sharpening.

Additionally shown in FIG. 6, photograph 300B comprises an image taken with the first device (e.g., Nexus™ smartphone) having undergone minimal initial processing (initial processing that differs from that of photograph 300A). As a result, the photograph 300B has a more generic "native" appearance. Photograph 302B is further image processed from the photograph 300B on the same second device (e.g., the laptop (Mac®) using the same imaging technique (e.g., "preview" photo using the "auto levels" feature for color and sharpening). The result is that the photograph 302B maintains a look more similar to that of photograph 300B than the photograph 302A to the photograph 300A. Additionally, as noted above the photograph 302B differs substantially from the photograph 302A despite having undergone the same image editing (e.g., "preview" photo using the "auto levels" feature for color and sharpening) on the same host device (e.g., the laptop (Mac®).

If the two photographs 300A and 300B had been substantially identical (initially processed similarly so as to contain the same or substantially the same data) as is achieved by the systems and methods discussed herein, a more optimized digital image processing can occur as the host device starts with the same or similar file in both instances (which has already undergone at least one round of prior editing to reduce file size and/or to perform edits that would otherwise not have been possible or would not have the same effect due to "image lock"). Put another way, less variation between the photographs 302A and 302B can result using the disclosed systems and methods because "data lock" can be reduced or avoided.

FIG. 7 shows a system 400 that includes smart glasses 401, a smartphone 402A and another device 402B. In the example of FIG. 7, the smart glasses 401 can comprise the first device or the image capture device as previously discussed and the smartphone 402A or the device 402B can comprise the second device. Thus, the device 402B can be either the first device or the second device as previously discussed in reference to prior FIGURES.

FIG. 7 shows a front perspective view of the smart glasses 401 that include an integrated camera and image processing system as previously described. Thus, in the example of FIG. 7 the smart glasses 401 comprise the first device. The smart glasses 401 can include a body 403 comprising a front piece or frame 406 and a pair of temples 409 connected to the frame 406 for supporting the frame 406 in position on a user's face when the smart glasses 401 are worn by a user. The frame 406 can be made from any suitable material such as plastics or metal, including any suitable shape memory alloy.

The smart glasses 401 can carry a pair of optical elements in the form of a pair of lenses 412. The lenses 412 can be held by corresponding optical element holders in the form of a pair of rims 415 forming part of the frame 106. The rims 415 are connected by a bridge 418. In other embodiments, of one or both of the optical elements can be a display, a display assembly, or a lens and display combination.

The frame 406 can include a pair of end pieces 421 defining lateral and portions of the frame 406. In this example, a variety of electronics components are housed in one or both of the end pieces 121, as discussed in more detail below.

The temples 409 are coupled to the respective end pieces 421. In this example, the temples 409 can be coupled to the frame 406 by respective hinges so as to be hingedly movable between a wearable mode (as shown in FIG. 1) and a collapsed mode in which the temples 109 are pivoted towards the frame 406 to lie substantially flat against it. In other embodiments, the temples 409 can be coupled to the frame 406 by any suitable means, or can be rigidly or fixedly secured to the frame 406 so as to be integral therewith.

The smart glasses 401 can have onboard electronics components including a computing device, such as a computer 424, which can in different embodiments be of any suitable type so as to be carried by the body 403. In some embodiments, the computer 424 is at least partially housed in one or both of the temples 409. In the present embodiment, various components of the computer 424 are housed in the lateral end pieces 421 of the frame 406. The computer 424 includes one or more processors including the image processors previously discussed with respect to prior FIGURES and memory, wireless communication circuitry, and a power source. The computer 424 comprises low-power circuitry, high-speed circuitry, and at least one image processor, for example. Various embodiments may include these or additional elements in different configurations or integrated together in different ways. The wireless communication circuitry can communicate with the smartphone 402A and/or the additional device 402B.

The computer 424 additionally includes a battery 427 or other suitable portable power supply. In one embodiment, the battery 427 is disposed in one of the temples 409. In the smart glasses 401 shown in FIG. 7, the battery 427 is shown as being disposed in one of the end pieces 421, being electrically coupled to the remainder of the computer 424 housed in the corresponding end piece 421.

The smart glasses 401 are camera-enabled, in this example including a camera 430 mounted in one of the end pieces 421 and facing forwards so as to be aligned more or less with the direction of view of a wearer of the smart glasses 401. The camera 430 is configured to capture digital image(s). Operation of the camera 430 can be controlled by a camera controller (see, e.g. FIG. 3) provided by the computer 424, image data representative of the digital image captured by the camera 430 can be edited by the image processor(s) and can be temporarily stored on a memory forming part of the computer 424. In some embodiments, the smart glasses 401 can have a pair of cameras 430, e.g. housed by the respective end pieces 421.

The smart glasses 401 further include one or more input and output devices permitting communication with and control of the camera 430 and for communication of the digital image(s). In particular, the smart glasses 401 include one or more input mechanisms for enabling user control of one or more functions of the smart glasses 401. In this embodiment, the input mechanism comprises a button 415 mounted on the frame 406 so as to be accessible on top of one of the end pieces 421 for pressing by the user. In addition to any other functions that may be controlled by operation of the button 415, the button 415 in this example provides a photo trigger mechanism enabling the user to trigger photo capture by the camera 430. In the current example embodiment, a photo capture command can be issued by a single, relatively short button press (e.g., shorter than a second), while a video capture command can be issued by a press-and-hold action.

Modules, Components, and Logic

Certain embodiments are described herein as including logic or a number of components, modules, or mechanisms. Modules can constitute hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 8:
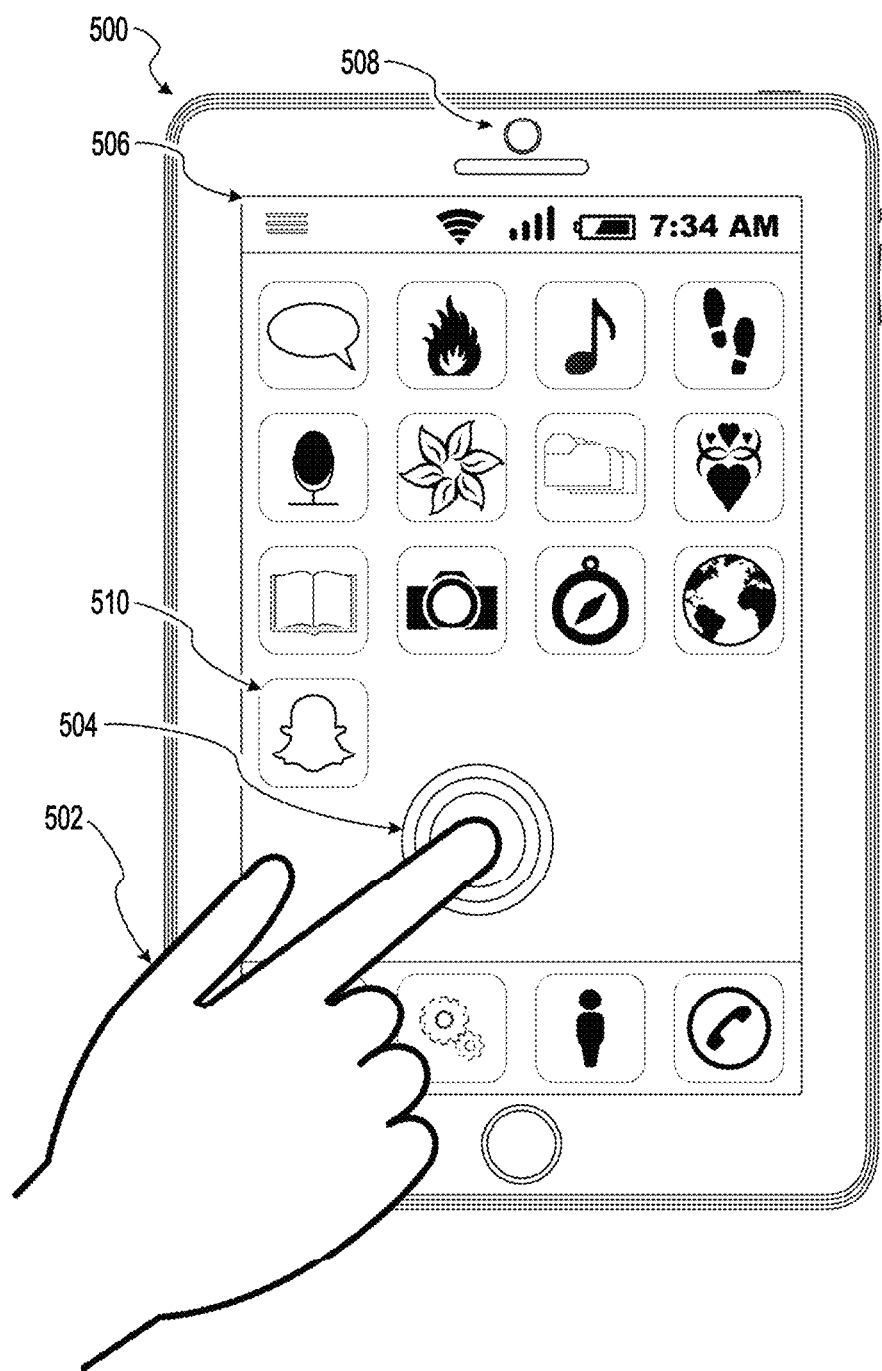
FIG. 8 is a user interface diagram depicting an example mobile device and mobile operating system interface, according to some example embodiments.

FIG. 8 illustrates an example first or second device 500 (e.g., a smartphone) executing a mobile operating system (e.g., IOS™, ANDROID™, WINDOWS® Phone, or other mobile operating systems), consistent with some embodiments. In one embodiment, the first or second device 500 includes a touch screen operable to receive tactile data from a user 502. For instance, the user 502 may physically touch 504 the device 500, and in response to the touch 504, the device 500 may determine tactile data such as touch location, touch force, or gesture motion. In various example embodiments, the device 500 displays a home screen 506 (e.g., Springboard on IOS™) operable to launch applications or otherwise manage various aspects of the device 500. In some example embodiments, the home screen 506 provides status information such as battery life, connectivity, or other hardware statuses. The user 502 can activate user interface elements by touching an area occupied by a respective user interface element. In this manner, the user 502 interacts with the applications of the device 500. For example, touching the area occupied by a particular icon included in the home screen 506 causes launching of an application corresponding to the particular icon.

The device 500, as shown in FIG. 8, includes a camera 508 that can be used with the methods and systems as previously described. The camera can comprise an imaging device coupled to the device 500 capable of capturing digital images, one or more successive digital images, or a video stream, etc. A selectable user interface element or other implement can be used to initiate capture of image(s) or a video stream. This image(s) or video stream can be passed to systems for processing according to the one or more techniques described in the present disclosure.

Many varieties of applications (also referred to as "apps") can be executing on the device 500, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the device 500 includes a messaging app, an audio recording app, a camera app, an image editing app, a book reader app, a media app, a fitness app, a file management app, a location app, a browser app, a settings app, a contacts app, a telephone call app, or other apps (e.g., gaming apps, social networking apps, biometric monitoring apps). In another example, the device 500 includes a social messaging and display app 510 such as SNAPCHAT® that, consistent with some embodiments, allows users to edit digital images and exchange ephemeral messages that include media content. In this example, the social messaging and display app 510 can incorporate aspects of embodiments described herein. For example, in some embodiments the social messaging application includes an ephemeral gallery of media (including edited digital images) created by users of the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral digital images (i.e. video clips or still image(s)) which are deleted following a deletion trigger event such as a viewing time or viewing completion.

Software Architecture

Figure 9:
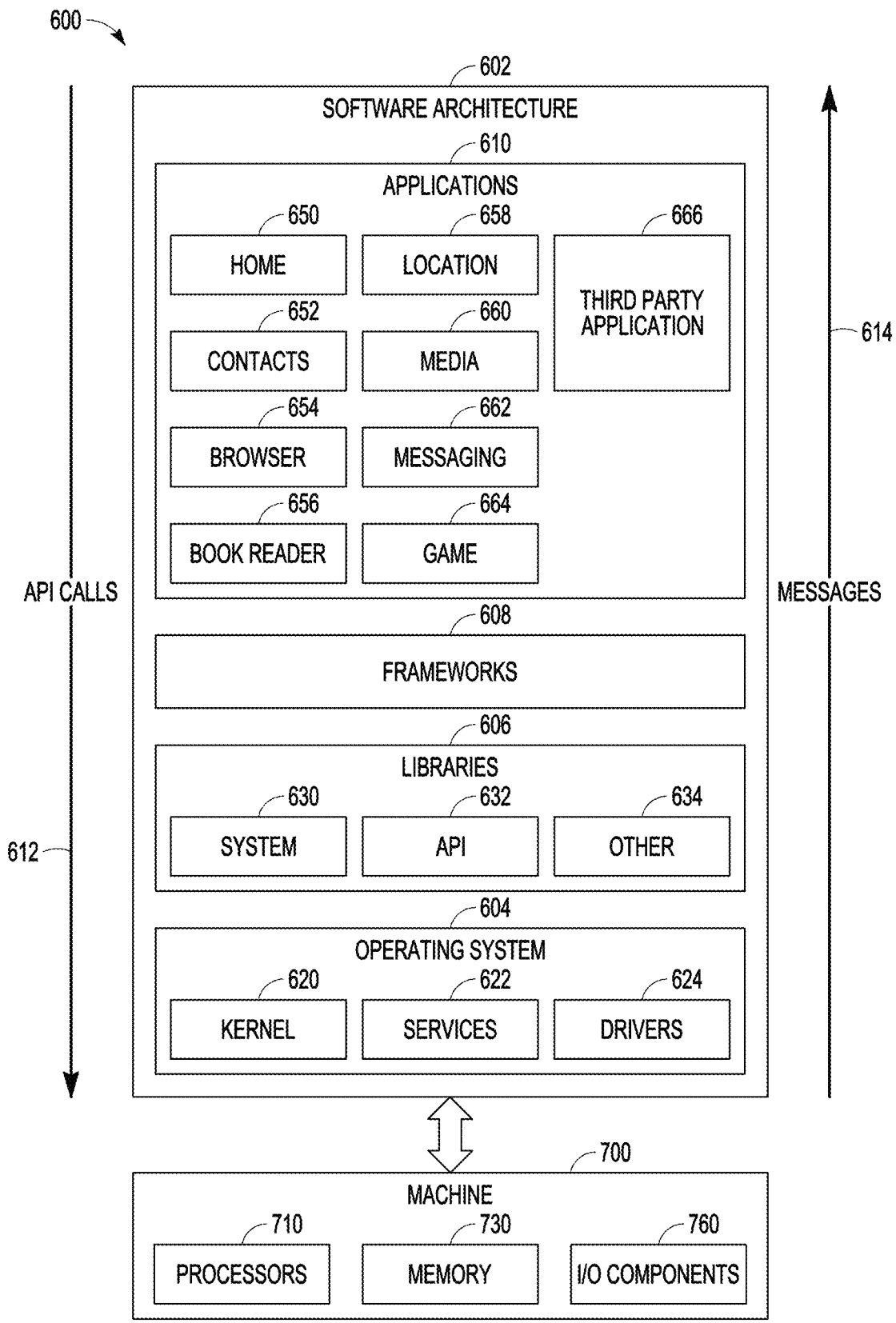
FIG. 9 is a block diagram illustrating an example of a software architecture that may be installed on a machine, according to some example embodiments.

FIG. 9 is a block diagram 600 illustrating an architecture of software 602, which can be installed on the devices described above. FIG. 9 is merely a non-limiting example of a software architecture, and it will be appreciated that many other architectures can be implemented to facilitate the functionality described herein. In various embodiments, the software 602 is implemented by hardware such as the machine 700 of FIG. 10 that includes processors 710, memory 730, and I/O components 750. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system or platform.

In an example embodiment, the applications 610 include a home application 650, a contacts application 652, a browser application 654, a book reader application 656, a location application 658, a media application 660, a messaging and display application 662, a game application 664, and a broad assortment of other applications such as a third party application 666. According to some embodiments, the applications 610 are programs that execute functions defined in the programs. Various programming languages can be employed to create the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 666 can invoke the API calls 612 provided by the operating system 604 to facilitate functionality described herein.

Example Machine Architecture and Machine-Readable Medium

Figure 10:
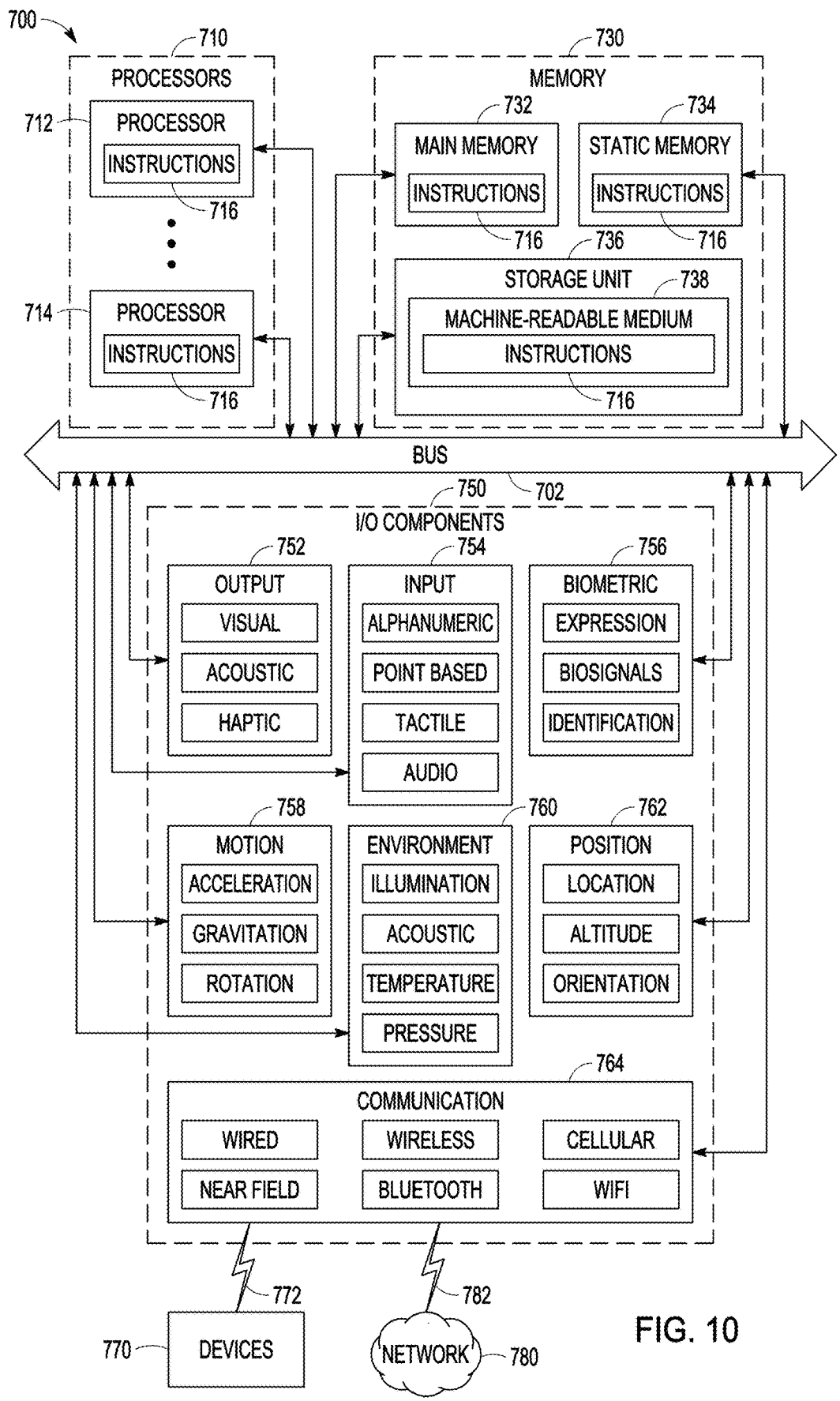
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of the machine 700, according to some embodiments, able to read instructions (e.g., processor executable instructions) from a machine-readable medium (e.g., a non-transitory processor-readable storage medium) and perform any of the methodologies discussed herein. Specifically, FIG. 10 shows a diagrammatic representation of the machine 700 in the example form of a computer system, within which instructions 716 (e.g., software, a program, an application, an applet, an app, or other executable code) for causing the machine 700 to work in concert with or as part of the methods and systems previously described to execute any of the methodologies discussed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, smart glasses, a digital camera, a server computer, a client computer, a personal computer (PC), a tablet computer, a laptop computer, a netbook, a set-top box (STB), a personal digital assistant (PDA), an entertainment media system, a cellular telephone, a smartphone, a mobile device, another type of wearable device other than smart glasses (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" or "device" or "apparatus" shall also be taken to include a collection (plurality) of such that individually or jointly execute the instructions 716 to perform any of the methodologies discussed herein.

In various embodiments, the machine 700 comprises processors 710, memory 730, and I/O components 750, which can be configured to communicate with each other via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 712 and a processor 714 that may execute the instructions 716. The term "processor" is intended to include multi-core processors that may comprise two or more independent processors (also referred to as "cores") that can execute instructions contemporaneously. Although FIG. 10 shows multiple processors, the machine 700 may include a single processor with a single core, a single processor with multiple cores (e.g., a multi-core processor), multiple processors with a single core, multiple processors with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown in an example embodiment to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by the machine 700 (e.g., the devices previously discussed), such that the instructions, when executed by processors of the machine 700 (e.g., processors 710), cause the machine 700 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 10. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or mouth gestures), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium should be considered as being transportable from one physical location to another. Additionally, since the machine-readable medium 738 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

EXAMPLES

Example 1 is a system that can optionally comprise any one or any combination of the following: a first device comprising: a first image processor; a first communication module coupled to the first image processor; and a first memory coupled to the first image processor and storing instructions that, when executed by the first image processor, cause the first device to: perform a first one or more edits on an initial digital image, generate, based on the first one or more edits, a first modified digital image, wherein the first one or more edits comprise nominal edits made to provide the first modified digital image with a baseline amount of information for flexibility of further image processing, transmit the first modified digital image using the first communication module, a second device comprising: a second image processor; a user interface coupled to the second image processor and including a display; a second communication module coupled to the second image processor and configured to communicate with the first communication module to receive the first modified digital image; and a second memory coupled to the second image processor and storing instructions that, when executed by the first image processor, cause the second device to: retrieve the first modified digital image using the second communication module, perform a second one or more edits on the first modified digital image, generate, based on the second one or more edits, a second modified digital image, wherein the second one or more edits comprise criteria driven edits to achieve a desired image attribute for the second modified digital image, and present the second modified digital image on the display of the user interface for one or more of user review, additional edit via the user interface and approval.

In Example 2, the subject matter of Example 1 optionally includes the second memory further stores instructions for causing the system to: generate a third modified digital image based on the additional edit to the second modified digital image received from the user via the user interface; and transmit the third modified digital image to one or more of a plurality of further devices or a network using the second communication module.

In Example 3, the subject matter of any one or more of Examples 1-2 optionally includes the first device comprises an image capture device that includes a camera that captures the initial digital image.

In Example 4, the subject matter of any one or more of Examples 1-3 optionally includes the second one or more edits are reliant on the first one or more edits for processing flexibility to achieve the desired image attribute.

In Example 5, the subject matter of any one or more of Examples 1-4 optionally includes the first device comprises a secondary device that receives the initial digital image from an image capture device.

In Example 6, the subject matter of any one or more of Examples 1-5 optionally includes the second one or more edits are performed with artificial intelligence.

In Example 7, the subject matter of any one or more of Examples 1-6 optionally includes the first one or more edits are user agnostic and comprise one or more of bad pixel correction, Bayer noise reduction, chromatic aberration correction, color shading correction, white balance, Bayer de-mosaic, gamma correction to optimized to compress data, and YUV noise reduction.

In Example 8, the subject matter of any one or more of Examples 1-7 optionally includes the second one or more edits are user subjective and comprise one or more of color correction, luma shading correction, luma sharpening, contrast/tone tuning, saturation tuning, customized color tuning, YUV noise reduction, dithering, customized geometry wrap correction, special effects and application based edits.

In Example 9, the subject matter of any one or more of Examples 1-8 optionally includes the second memory further stores instructions for causing the system to transmit the second modified digital image to one or more of a plurality of further devices or a network using the second communication module.

Example 10 is a computer-implemented method that can optionally comprise any one or any combination of: retrieving, by a first computer enabled device, an initial digital image; performing a first one or more edits to the initial digital image; generating, based on the first one or more edits, a first modified digital image with a baseline amount of information for flexibility of further image processing; transmitting, by the first computer enabled device, the first modified digital image to a second computer enabled device; performing a second one or more edits to the first modified digital image on the second computer enabled device, the second one or more edits comprise criteria driven edits to achieve a desired image attribute; generating, based on the second one or more edits, a second modified digital image with the desired image attribute; and presenting the second modified digital image on a display of a user interface coupled to the second computer enabled device.

In Example 11, the subject matter of Example 10 optionally includes performing a third one or more edits to the second modified digital image on the second computer enabled device; generating a third modified digital image based on the third one or more edits to the second modified digital image; and transmitting, by the second computer enabled device, the third modified digital image to one or more of a plurality of further devices or a network.

In Example 12, the subject matter of Example 11 optionally includes the third one or more edits are performed via the user interface and the second one or more edits are performed by artificial intelligence.

In Example 13, the subject matter of any one or more of Examples 10-12 optionally includes capturing the initial digital image with a camera of the first computer enabled device.

In Example 14, the subject matter of any one or more of Examples 10-13 optionally includes receiving the initial digital image from an image capture device.

In Example 15, the subject matter of any one or more of Examples 10-14 optionally includes the performing first one or more edits are user agnostic and comprise one or more of bad pixel correction, Bayer noise reduction, chromatic aberration correction, color shading correction, white balance, Bayer de-mosaic, gamma correction to optimized to compress data, and YUV noise reduction.

In Example 16, the subject matter of any one or more of Examples 10-15 optionally includes performing the second one or more edits are user subjective and comprise one or more of color correction, luma shading correction, luma sharpening, contrast/tone tuning, saturation tuning, customized color tuning, YUV noise reduction, dithering, customized geometry wrap correction, special effects and application based edits.

Example 17 is a non-transitory computer-readable medium storing instructions that, when executed by a computer system, cause the computer system to optionally perform any one or any combination of the following: capture an initial digital image with a camera of an image capture device; perform a first one or more edits on an initial digital image using the image capture device; generate, based on the first one or more edits, a first modified digital image, wherein the first one or more edits comprise nominal edits made to provide the first modified digital image with a baseline amount of information for flexibility of further image processing; and transmit the first modified digital image using the first communication module from the image capture device to a host device; perform a second one or more edits on the first modified digital image using the host device, generate, based on the second one or more edits, a second modified digital image, wherein the second one or more edits comprise criteria driven edits to achieve a desired image attribute for the second modified digital image, and present the second modified digital image on a display of a user interface of the host device for one or more of user review, additional edit via the user interface and approval.

In Example 18, the subject matter of Example 17 optionally includes generate a third modified digital image based on the additional edit to the second modified digital image received from the user via the user interface; and transmit the third modified digital image to one or more of a plurality of further devices or a network using the second communication module.

In Example 19, the subject matter of any one or more of Examples 17-18 optionally includes the image capture device comprises smart glasses.

In Example 20, the subject matter of any one or more of Examples 17-19 optionally includes the second one or more edits are user subjective and the first one or more edits are user agnostic, and wherein the second one or more edits are reliant on the first one or more edits for processing flexibility to achieve the desired image attribute.

In Example 21, the above disclosed Examples 1-20 can optionally be combined in any manner.

What is claimed is:

1. A system comprising:
a first device comprising a mobile device, the first device comprising:
a camera that captures an initial digital image;
a first image processor;
a first communication module coupled to the first image processor; and
a first memory coupled to the first image processor and storing instructions that, when executed by the first image processor, cause the first device to:
perform a first one or more edits on an initial digital image, wherein the first one or more edits are user agnostic, are performed without user input or direction and comprise one or more of bad pixel correction, Bayer noise reduction, chromatic aberration correction, color shading correction, white balance, Bayer de-mosaic, gamma correction to optimized to compress data, and YUV noise reduction,
generate, based on the first one or more edits, a first modified digital image, wherein the first one or more edits comprise nominal edits made to provide the first modified digital image with a baseline amount of information for flexibility of further image processing and are done to achieve better image quality relative to image file size, and
transmit the first modified digital image using the first communication module,
a second device comprising a secondary device, the secondary device comprising:
a second image processor;
a second communication module coupled to the second image processor and configured to communicate with the first communication module; and
a second memory coupled to the second image processor and storing instructions that, when executed by the second image processor, cause the second device to:
retrieve the initial digital image using the second communication module,
perform a second one or more edits on the initial digital image digital image, wherein the second one or more edits are user agnostic, are performed without user input or direction and comprise one or more of bad pixel correction, Bayer noise reduction, chromatic aberration correction, color shading correction, white balance, Bayer de-mosaic, gamma correction to optimized to compress data, and YUV noise reduction,
generate, based on the second one or more edits, a second modified digital image, wherein the second one or more edits comprise nominal edits made to provide the first modified digital image with a baseline amount of information for flexibility of further image processing and are done to achieve better image quality relative to image file size, and wherein the second one or more edits and the first one or more edits are performed in tandem with one another, and
transmit the second modified digital image using the second communication module,
a third device comprising a host device, the third device comprising:
a third image processor;
a user interface coupled to the third image processor and including a display;
a third communication module coupled to the first image processor and second image processor and configured to communicate with the first communication module and the second communication module;
a third memory coupled to the third image processor and storing instructions that when executed by the third image processor, cause the third device to:
retrieve the first modified digital image and the second modified digital image using the third communication module,
combine the first modified digital image and the second modified digital image to form a combined modified digital image,
perform a third one or more edits on the combined modified digital image, wherein the third one or more edits are user subjective, are performed according to user defined criteria, are performed at the discretion of the user and comprise one or more of color correction, luma shading correction, luma sharpening, contrast/tone tuning, saturation tuning, customized color tuning, YUV noise reduction, dithering, customized geometry wrap correction, special effects and application based edits, wherein the third one or more edits are reliant on the first one or more edits and the second one or more edits for processing flexibility to achieve a desired image attribute,
generate, based on the third one or more edits, a third modified digital image, wherein the third modified digital image has the desired image attribute according to the user defined criteria, and
present the third modified digital image on the display of the user interface for one or more of user review, additional edit via the user interface and approval.

2. The system of claim 1, wherein the third memory further stores instructions for causing the system to:
generate a fourth modified digital image based on the additional edit to the third modified digital image received from the user via the user interface; and
transmit the fourth modified digital image to one or more of a plurality of further devices or a network using the third communication module.

3. The system of claim 1, wherein the third one or more edits are performed with artificial intelligence.

4. The system of claim 1, wherein the third memory further stores instructions for causing the system to transmit the third modified digital image to one or more of a plurality of further devices or a network using the third communication module.

5. A computer-implemented method comprising:
retrieving, by a first computer enabled device, an initial digital image;
retrieving, by a second computer enabled device, the initial digital image;

performing in tandem a first one or more edits to the initial digital image with the first computer enabled device and a second one or more edits to the initial digital image with the second computer enabled device, wherein the performing first one or more edits and the second one or more edits are user agnostic, are performed without user input or direction and comprise one or more of bad pixel correction, Bayer noise reduction, color shading correction, chromatic aberration correction, white balance, Bayer de-mosaic, gamma correction to optimized to compress data, and YUV noise reduction;

generating, based on the first one or more edits and the second one or more edits, a first modified digital image and second modified digital image, wherein the first one or more edits and the second one or more edits comprise nominal edits made to provide the first modified digital image and the second modified digital image with a baseline amount of information for flexibility of further image processing and are done to achieve better image quality relative to image file size for the first modified digital image;

transmitting, by the first computer enabled device and the second computer enabled device, the first modified digital image and the second modified digital image to a third computer enabled device;

combining the first modified digital image and the second modified digital image with the third computer enable device to form a combined modified digital image;

performing a third one or more edits to the combined modified digital image on the third computer enabled device, the third one or more edits comprise criteria driven edits, are performed according to user defined criteria and are performed at the discretion of the user to achieve a desired image attribute, wherein performing the third one or more edits are user subjective and comprise one or more of color correction, luma shading correction, luma sharpening, contrast/tone tuning, saturation tuning, customized color tuning, YUV noise reduction, dithering, customized geometry wrap correction, special effects and application based edits, wherein the third one or more edits are reliant on the first one or more edits for processing flexibility to achieve the desired image attribute;

generating, based on the third one or more edits, a third modified digital image with the desired image attribute according to the user defined criteria; and presenting the third modified digital image on a display of a user interface coupled to the third computer enabled device.

6. The method of claim 5, further comprising:
performing a fourth one or more edits to the third modified digital image on the third computer enabled device;
generating a fourth modified digital image based on the fourth one or more edits to the fourth modified digital image; and
transmitting, by the third computer enabled device, the fourth modified digital image to one or more of a plurality of further devices or a network.

7. The method of claim 6, wherein the fourth one or more edits are performed via the user interface and the third one or more edits are performed by artificial intelligence.

8. The method of claim 5, further comprising capturing the initial digital image with a camera of the first computer enabled device.

9. The method of claim 5, further comprising receiving the initial digital image from an image capture device.

10. A non-transitory computer-readable medium storing instructions that, when executed by a computer system, cause the computer system to:
capture an initial digital image with a camera of an image capture device that comprises one of a mobile phone, tablet or wearable device;
perform a first one or more edits on the initial digital image using the image capture device;
generate, based on the first one or more edits, a first modified digital image;
transmit to the host device the first modified digital image using a first communication module of the image capture device;
transmit using the first communication module the initial digital image to a secondary device;
perform a second one or more edits on the initial digital image using the secondary device, wherein the second one or more edits are performed in tandem with the first one or more edits;
generate, based on the second one or more edits, a second modified digital image;
transmit to the host device the second modified digital image using a second communication module of the secondary device;
combine the first modified digital image and the second modified digital image using the host device to form a combined modified digital image;
perform a third one or more edits on the combined modified digital image using the host device;
generate, based on the third one or more edits, a third modified digital image; and
present the third modified digital image on a display of a user interface of the host device for one or more of user review, additional edit via the user interface and approval.

11. The non-transitory computer-readable medium of claim 10, further comprising:
generate a fourth modified digital image based on the additional edit to the third modified digital image received from the user via the user interface; and
transmit the fourth modified digital image to one or more of a plurality of further devices or a network using a third communication module of the host device.

12. The non-transitory computer-readable medium of claim 10, wherein the image capture device comprises smart glasses.

* * * * *